Figure 1:
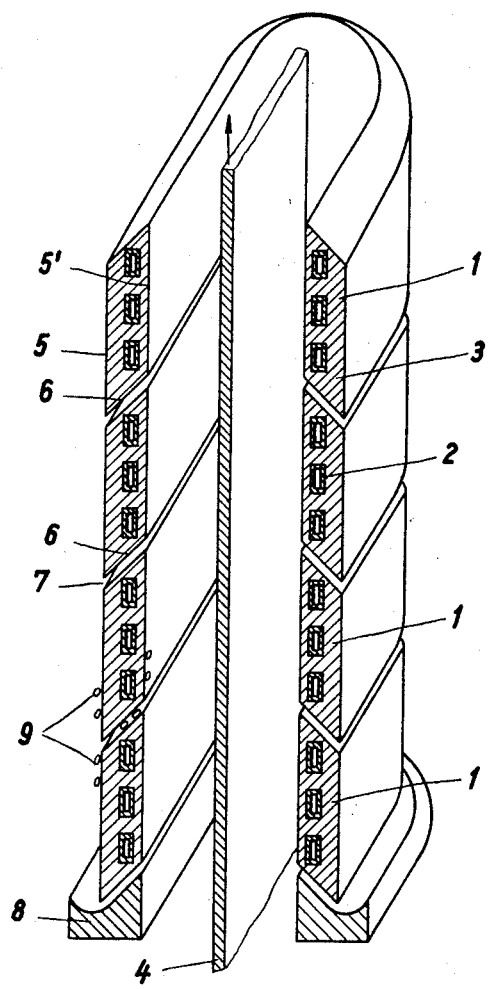

May 12, 1964   F. ALF   3,133,185
INDUCTION HEATING APPARATUS
Filed Nov. 1, 1961   2 Sheets-Sheet 2

Inventor:
Fritz Alf
Cushman, Darby & Cushman
Attorneys

United States Patent Office 3,133,185
Patented May 12, 1964

3,133,185
INDUCTION HEATING APPARATUS
Fritz Alf, Landshut, Lower Bavaria, Germany, assignor to Deutsche Edelstahlwerke Aktiengesellschaft, Krefeld, Germany, and Allgemeine Elektricitäts-Gesellschaft, Berlin-Grunewald, Germany
Filed Nov. 1, 1961, Ser. No. 149,401
Claims priority, application Germany Nov. 3, 1960
11 Claims. (Cl. 219—10.61)

This invention relates to induction heating apparatus in which one or more inductor units are vertically or obliquely aligned the one above the other, each enclosed by or embedded in a cast body of a castable compound or a protective body. Induction heating equipment of this kind is, as such, already known. Generally the individual inductors have an elongated cylindrical, oval or flat shape, and they are aligned vertically or obliquely the one above the other in such a way that the treated work can be passed through their interior. Principally they are used for inductively drying varnishes, for inductively tinning metal strip and so forth. The strip runs over rollers into the heating region of the inductor units and, in passing through this region, it is heated to a given temperature by the action of the currents induced in the strip.

Especially in larger plants of this kind undesirable side effects have been found to occur at the beginning of the heat treatment, due to condensation of moisture in the interior of the inductor. The inductor is generally water-cooled. Consequently the compound in which the coil is enclosed or embedded first has the same temperature as the coolant. The heated strip heats the surrounding space, thus causing not only the moisture adhering to the strip itself but also the moisture contained in the air inside the inductor to condense on the colder surface of the internal walls of the inductor units, forming droplets which either fall on the already hot strip or on to equipment located beneath, such as tinning baths, varnish vats, or into a varnishing machine. These occurrences are a great inconvenience as they interfere with the regular and reliable performance of the intended work. Frequently, parts of the strip must be rejected because the dripping condensed water has spoiled a coating of tin or a varnish coat which fails to adhere to its base at points where it has been contacted by water.

In order to overcome this drawback the invention proposes to contrive induction heating apparatus comprising one or more inductor units in such a way that the outer edges of the end faces of the or each unit are located at a lower level than the inner edges, the faces thus sloping downwards to the outside. When several inductor units are aligned the one above the other and the outer edges of adjacent end faces of neighbouring inductor units are located at a lower level than the inner edges, the inductor units are relatively spaced to leave annular gaps which slope downwards to the outside. This form of construction is especially useful in induction apparatus of comparatively large size, such assemblies often having an overall height of several yards. At the bottom end of the lowermost inductor unit a peripheral external trough may be provided, conveniently consisting of plastic or a castable compound. Water drops formed by condensation inside each inductor unit will then trickle through the outwardly sloping gaps to the outside of the assembly, where they can run down into the trough at the bottom, to be collected therein without causing damage.

In the further development of the invention it is proposed to provide the ends of the inductor units with curved faces in such manner that the gaps between neighbouring inductor units will likewise be curved. Alternatively, adjacent end faces of neighbouring units may be arranged at an angle to give rise to gaps which diverge towards the outside. If the end faces are curved the curvature of adjacent faces may differ to give rise to gaps which are wider on the outside of the inductor assembly than on the inside.

Naturally, apart from the gaps created by spacing the several inductor units, channels which slope obliquely outwards may be provided also in the individual units as such.

Figure 2:
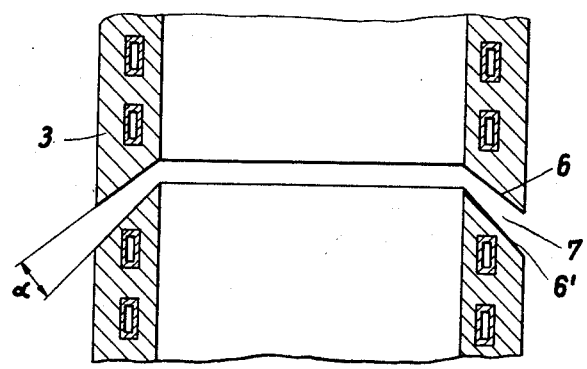
Figure 3:
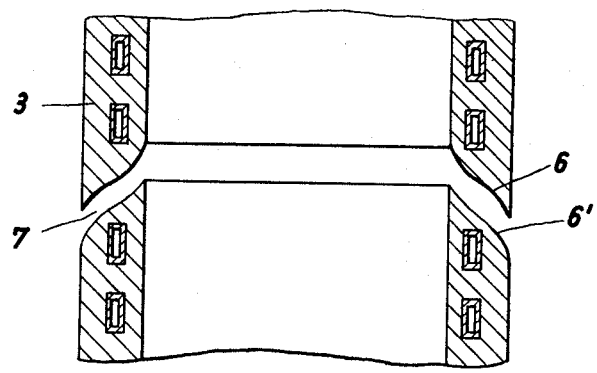

A preferred embodiment of induction heating equipment according to the invention will now be described by reference to the accompanying drawings in which FIG. 1 illustrates the principle of an induction heating assembly according to the invention, shown in vertical longitudinal section, FIGS. 2 and 3 are fragmentary longitudinal sections of an induction heating assembly according to FIG. 1, illustrating different kinds of gap between the individual inductor units.

With reference first to FIG. 1, several inductor units 1 in which the turns of a coil 2 are encast in a compound 3, are arranged in vertical alignment the one above the other. In the direction indicated by arrows a metal strip 4 which is to be treated travels through the heating region of the several inductor units. The outer edges 5 of the end faces 6 of the units are located at a level below the level of the corresponding inner edges 5' and the end faces 6 of the units slope downwards to the outside of the units. The inductor units 1 are relatively spaced to leave intervening gaps 7 which thus extend from the inside in the downward direction to the outside of the assembly. Below the lowermost inductor unit is a circular trough 8 for collection of the water droplets 9 which have condensed on the inside face of the inductors. It will be understood that this trough 8 may be provided with an opening, not shown in the drawing, through which the water can drain away before over-flowing when the volume of condensation is considerable.

In FIG. 2 the adjacent end faces 6 and 6' of two neighbouring units form an angle with one another. This angle is conveniently so chosen that the inside opening of the gap 7 between two units has a capillary effect on droplets trickling down from above, thus drawing them into the gap. On the outside of the units the gap is wider to permit the drops to trickle out easily.

In FIG. 3 adjacent end faces of two neighbouring units have a slightly curved shape to facilitate easy and even entry of droplets of water into the gap 7. Naturally the arrangement illustrated in FIG. 2 can be applied to the arrangement shown in FIG. 3, i.e., the width of gap 7 on the inside may be narrower than its width on the outside of the assembly.

What I claim is:

1. An induction coil comprising an inductor enclosed by or embedded in a cast or protective body to form a unit providing inner and outer faces and end faces and suitable for the passage through its interior of the work that is to be treated, at least one said end face of the unit sloping throughout its full distance from said inner face to the said outer face so that when the unit is in a vertical position with the said end face lowermost, the outer edge of said end face will be outside the vertical outside plane of said inductor and at a lower level than the inner edge to cause condensation on any of said faces to drip from said body at said outer edge.

2. A unit according to claim 1, in which both end faces of the unit slope in the same direction from the inside outwards so that the unit can be disposed in a vertical or oblique position with the outer end of each end face at a lower level than the inner edge.

3. An assembly of induction coils each enclosed by or embedded in a cast or protective body to form a unit providing inner and outer faces and end faces, and arranged one above the other for the passage through them of the work that is to be treated, the assembly being arranged with opposed end faces of the units sloping from the inside downwards and outwards and with the units being spaced from one another so that between opposed end faces an annular gap is formed which therefore also slopes downwards and outwards from the inside.

4. A unit according to claim 1 and a peripheral external trough at the bottom of the unit for receivig droplets from the unit.

5. A unit according to claim 4, in which said trough is formed by an annular member providing an annular face sloping from the inside downwardly and outwardly to form a sloping annular gap under the lower end face of the lowermost unit, said gap leading to the said trough.

6. An assembly according to claim 3 comprising a peripheral external trough at the bottom of the lowermost unit for receiving droplets from the assembly.

7. A unit according to claim 1 in which the said end face curves outwards then downwards towards the outer edge.

8. An assembly of units according to claim 3 in which the said opposed end faces curve outwards and downwards and said annular gap between them also curves outwards and downwards.

9. A unit comprising an inductor enclosed by or embedded in a cast or protective body, and constructed for the passage through its interior of the work that is to be treated, at least one end face of the unit sloping from the inside outwards so that when the unit is in a vertical or oblique position with the said end face lowermost, the outer edge of said end face will be at a lower level than the inner edge, the said end face curving first outwards and downwards with a convex curve from the inside and then with a concave curve downwards and outwards to the outer periphery.

10. An assembly of units each comprising an inductor enclosed by or embedded in a cast or protective body, and arranged one above the other for the passage through them of the work that is to be treated, the assembly being arranged or arrangeable with opposed end faces of the units sloping from the inside downwards and outwards and with the units being spaced from one another so that between the or each pair of opposed end faces an annular gap is formed which therefore also slopes downwards and outwards from the inside, said opposed end faces forming an angle in such manner that the cross-section of the said annular gap formed therebetween diverges towards the outside.

11. An assembly of units each comprising an inductor enclosed by or embedded in a cast or protective body, and arranged one above the other for the passage through them of the work that is to be treated, the assembly being arranged or arrangeable with opposed end faces of the units sloping from the inside downwards and outwards and with the untis being spaced from one another so that between the or each pair of opposed end faces an annular gap is formed which therefore also slopes downwards and outwards from the inside, the opposed end faces curving outwards and downwards towards the outer edge, the opposed curvatures being different to create a curved gap which is wider on the outside than on the inside.

References Cited in the file of this patent

UNITED STATES PATENTS 2,848,566    Limpel _____ Aug. 19, 1958